US009169924B2

(12) United States Patent
Nagata et al.

(10) Patent No.: US 9,169,924 B2
(45) Date of Patent: Oct. 27, 2015

(54) AUTOMATIC TRANSMISSION CONTROL DEVICE

(71) Applicant: DENSO CORPORATION, Kariya, Aichi (JP)

(72) Inventors: Hiromitsu Nagata, Nagoya (JP); Fuminori Suzuki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/332,763

(22) Filed: Jul. 16, 2014

(65) Prior Publication Data

US 2015/0020632 A1 Jan. 22, 2015

(30) Foreign Application Priority Data

Jul. 17, 2013 (JP) ................................ 2013-148396

(51) Int. Cl.
*F16H 61/08* (2006.01)
*F16H 61/02* (2006.01)
*F16H 61/04* (2006.01)

(52) U.S. Cl.
CPC ........ *F16H 61/0265* (2013.01); *F16H 61/0248* (2013.01); *F16H 61/08* (2013.01); *F16H 2061/0481* (2013.01); *F16H 2061/0485* (2013.01); *F16H 2061/0488* (2013.01); *Y10T 477/689* (2015.01); *Y10T 477/6895* (2015.01); *Y10T 477/6931* (2015.01); *Y10T 477/6937* (2015.01); *Y10T 477/69362* (2015.01)

(58) Field of Classification Search
CPC .................... Y10T 477/689; Y10T 477/6895; Y10T 477/6931; Y10T 477/69362; Y10T 477/693625; Y10T 477/6937; F16H 61/0265; F16H 61/0248; F16H 2061/0481; F16H 2061/0485; F16H 2061/4088; F16H 61/08
USPC ................................................ 701/60, 64, 66
See application file for complete search history.

(56) References Cited

U.S. PATENT DOCUMENTS

2002/0120381 A1* 8/2002 Jeon ................................ 701/51
2004/0014562 A1* 1/2004 Kresse et al. ................. 477/107
2010/0095796 A1* 4/2010 Nakamura et al. ......... 74/473.33
2010/0294065 A1 11/2010 Funakoshi et al.
2011/0219904 A1* 9/2011 Shimizu et al. ............ 74/473.11
2011/0315499 A1* 12/2011 Fukushiro et al. ........... 192/3.57

FOREIGN PATENT DOCUMENTS

JP 11-082703 3/1999
JP 2001-235020 8/2001

OTHER PUBLICATIONS

Office Action (3 pages) dated Jul. 30, 2015 issued in corresponding Japanese Application No. 2013-148396 and English translation (2 pages).

* cited by examiner

*Primary Examiner* — Roger Pang
(74) *Attorney, Agent, or Firm* — Nixon & Vanderhye PC

(57) ABSTRACT

A control device for controlling an automatic transmission determines whether a fluid pressure of the operation fluid acting on a friction engagement element that is switched from a released-state to an engaged-state is in a fully-decreased state. If determined that the fluid pressure is not in a fully-decreased state, control of a manual valve is delayed. In such manner, the hydraulic circuit is switched by the manual valve after the full decrease of the fluid pressure of the operation fluid acting on the just-engaged friction engagement element. As a result, an abrupt rise of the fluid pressure is prevented and a shock in the automatic transmission is reduced.

3 Claims, 3 Drawing Sheets

ENGINE
AUTOMATIC TRANSMISSION
ECU
11
12
13
14
15
17
18
18
19
20
21
22
23
24

AUTOMATIC TRANSMISSION CONTROL DEVICE

CROSS REFERENCE TO RELATED APPLICATION

The present application is based on and claims the benefit of priority of Japanese Patent Application No. 2013-148396, filed on Jul. 17, 2013, the disclosure of which is incorporated herein by reference.

TECHNICAL FIELD

The present disclosure generally relates to an automatic transmission control device for switching a shift range to a target range by controlling a manual valve and a fluid-pressure control valve.

BACKGROUND INFORMATION

Generally, within an automatic transmission, a control system may control a manual valve and a fluid-pressure control valve, as disclosed in a patent document 1 (i.e., Japanese patent No. 5151543). The manual valve switches a gearbox hydraulic circuit to control an operation fluid which acts on friction engagement elements such as a clutch or a brake. The fluid-pressure control valve controls a fluid pressure of the operation fluid acting on the friction engagement elements. The manual valve and the fluid-pressure control valve are controlled according to a driver operation when the driver switches the shift range.

As shown in FIG. 2, for example, when a target range is switched from the D range to the N range by an operation of a range selector, by controlling the manual valve from a D range position to an N range position for the switching of the hydraulic circuit from the D range to the N range, the fluid pressure that acts on the friction engagement element is reduced, and the friction engagement element is switched to a released-state from an engaged-state.

Then, in case that a target range is switched back to the D range from the N range, by controlling the manual valve from the N range position to the D range position, the hydraulic circuit for the N range is switched to the hydraulic circuit for the D range, together with an output of an fluid-pressure increase instruction (i.e., a specific instruction value) for the increase of the fluid pressure that acts on the friction engagement element, and the friction engagement element is switched to an engaged-state from a released-state.

In such a course of switching of the hydraulic circuits, there may be a situation when a target range is switched back to the D range immediately after switching from the D range to the N range, depending on an operation of the range selector. In such a case, as indicated by a dashed line (in the fourth row) in FIG. 2, if the manual valve is controlled to be put in a D range position and the hydraulic circuit is switched to the hydraulic circuit for the D range at a time t1 of switching of a target range from the N range to the D range, the switching of the hydraulic circuit for the N range to the hydraulic circuit for the D range occurs before the fluid pressure that acts on the friction engagement element fully decreases, which results in that the fluid pressure that acts on the friction engagement element cannot be fully lowered at a timing of such a switching of the hydraulic circuit. Thus, in such a case, since the fluid pressure control which raises the fluid pressure that acts on the friction engagement element starts in a state where the fluid pressure that acts on the friction engagement element has not fully decreased, the fluid pressure that acts on the friction engagement element may rise steeply and abruptly, which causes a shock in the automatic transmission.

SUMMARY

It is an object of the present disclosure to provide a control device of an automatic transmission which prevents a shock caused at a time of range switching control.

In an aspect of the present disclosure, a control device of an automatic transmission includes a manual valve that switches a hydraulic circuit to control a flow of an operation fluid acting on a friction engagement element disposed in a gearbox and a fluid-pressure control valve to control a fluid pressure of the operation fluid acting on the friction engagement element. The control device also includes a controller that switches a shift range to a target range according to an operation of a range selector by controlling the manual valve and the fluid-pressure control valve, a decreased fluid-pressure determiner that determines whether the fluid pressure of the operation fluid acting on a just-engaged friction engagement element, which is switched from a released-state to an engaged-state according to a switching of the target range, is fully decreased, and a hydraulic circuit time delayer that delays a switching timing of the hydraulic circuit by the manual valve to a delayed timing when it is determined that the fluid pressure that acts on the just-engaged friction engagement element is not in a fully-decreased state.

According to such a configuration, when a target range is switched, by determining whether the fluid pressure that acts on the just-engaged friction engagement element switched to an engaged-state from a released-state according to such a switching of the target range is in a fully-decreased state (e.g., a state in which the fluid pressure is below a threshold value and a starting of a control for raising the fluid pressure will do no harm in the system) is determined, and, when the fluid pressure of the operation fluid acting on the engagement element is not in a fully-decreased state, the switching timing of the hydraulic circuit by the manual valve is delayed from a usual timing. In such manner, even in case that the fluid pressure that acts on the just-engaged friction engagement element has not yet fully decreased at a target range switch time, the hydraulic circuit can be switched by the manual valve at a delayed timing, i.e., at a time after full-decrease of the fluid pressure that acts on the just-engaged friction engagement element. Therefore, the rise of the fluid pressure that acts on the just-engaged friction engagement element by such a control is configured to be started in a fluid-pressure fully-decreased state, thereby preventing (i) a steep and abrupt rise of the fluid pressure and (ii) a shock in the automatic transmission.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
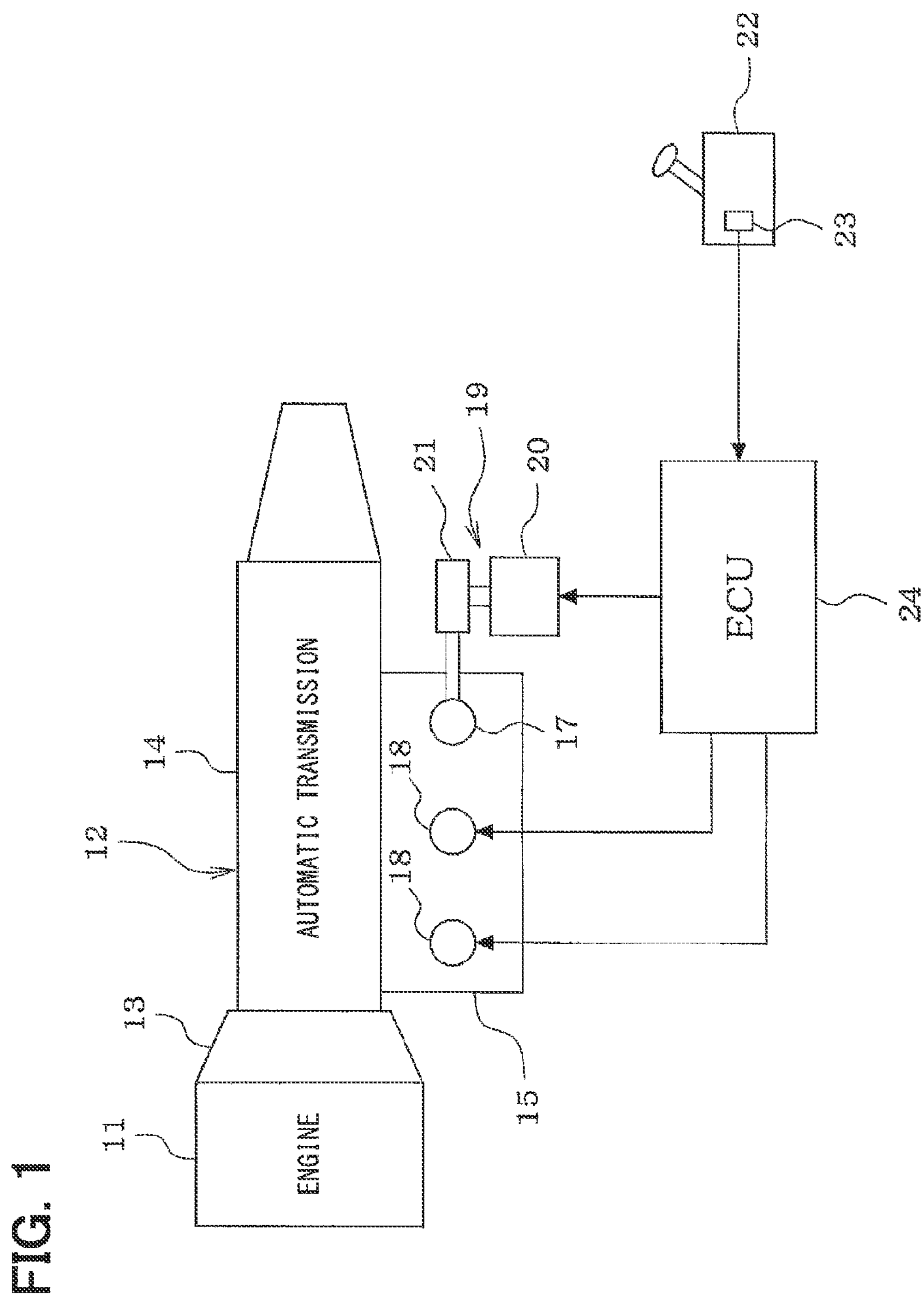
FIG. 1 is a schematic diagram of an outline configuration of an automatic transmission control system in one embodiment of the present disclosure.

One embodiment realizes a form of the present disclosure is described in the following with reference to the drawing.

Referring to FIG. 1, an outline configuration of an automatic transmission control system of vehicles is described.

An input axis of an automatic transmission 12 is connected with an output axis (i.e., a crankshaft) of an engine 11. This automatic transmission 12 has a torque converter 13, a speed change gear mechanism 14 (i.e., a gearbox), and a hydraulic control circuit 15 and the like.

Friction engagement elements (not shown), such as two or more clutches for switching a gear ratio and a brake, are provided in the speed change gear mechanism 14. Further, in the hydraulic control circuit 15, a manual valve 17 which switches the hydraulic circuit of an operation fluid of a friction engagement element, and a fluid-pressure control valve 18 which controls the fluid pressure that acts on the friction engagement element are provided.

A range switching mechanism 19 is a range switching mechanism having 4 positions which switches a shift range of the automatic transmission 12, i.e., between P range (i.e., a parking range), R range (i.e., a reverse range), N range (i.e., a neutral range), and D range (i.e., a drive range), for example. In this range switching mechanism 19, a motor 20 used as a driving source and a converter 21 (e.g., a detent mechanism) which converts a rotation driving force of the motor 20 into a straight line (i.e., a translational) driving force are provided, and the manual valve 17 is connected with this converter 21. Thereby, the range switching mechanism 19 drives the manual valve 17 under the power of motor 20.

In a range selector 22 of a lever type, a button type or the like, which is operated by the driver, a selector sensor 23 which detects an operation position of range selector 22 (i.e., a range selected by the range selector 22) is provided. The output of this selector sensor 23 is inputted into an electronic control unit (i.e., an "ECU") 24.

This ECU 24 (i.e., a controller) switches a target range according to an operation position of the range selector 22, and, by controlling the motor 20 of the range switching mechanism 19 according to the target range, an operation of the manual valve 17 is controlled and the fluid-pressure control valve 18 is controlled, for performing a switching of the shift range of the automatic transmission 12 to a target range.

Figure 2:
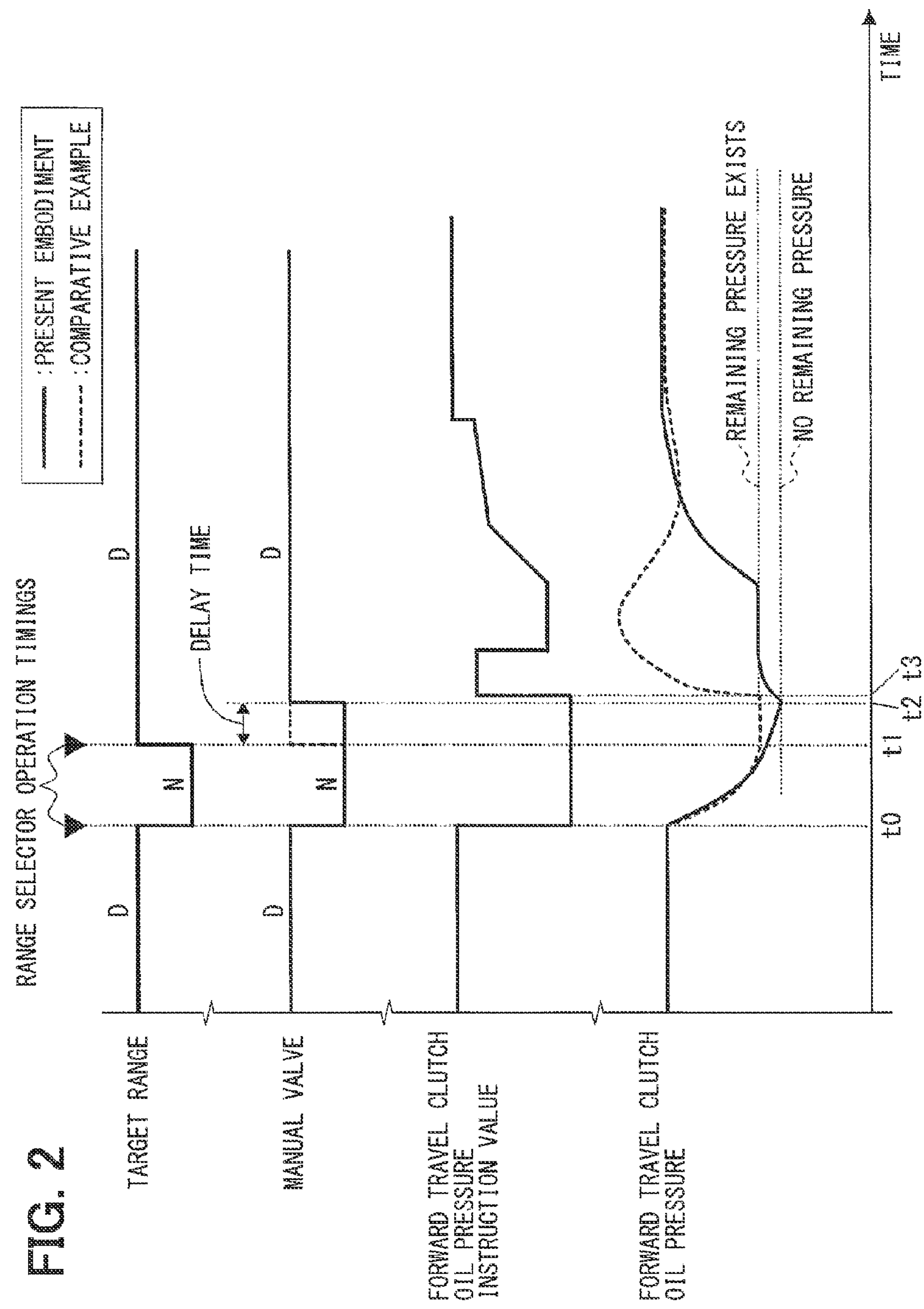
FIG. 2 is a time chart of a range switching control in one example.

In such range switching control, as shown in FIG. 2, for example, when a target range is switched to the N range from the D range by an operation of the range selector 22, by controlling the manual valve 17 from a D range position to an N range position, for the switching of the hydraulic circuit from the hydraulic circuit for the D range to the hydraulic circuit for the N range, the fluid pressure that acts on the friction engagement element (i.e., a forward travel clutch) is lowered, and the friction engagement element is switched to a released-state from an engaged-state.

Then, when a target range is switched to the D range from the N range by an operation of the range selector 22, the manual valve 17 is controlled from the N range position to the D range position to switch the hydraulic circuit, i.e., by the switching from the hydraulic circuit for the N range to the hydraulic circuit for the D range, an fluid pressure instruction value of the friction engagement element is outputted so that the fluid pressure that acts on the friction engagement element is raised, and the friction engagement element is switched to an engaged-state from a released-state.

In such course of switching of the hydraulic circuits, there may be a case that a target range is switched back to the D range immediately after switching from the D range to the N range, depending on an operation of the range selector 22. In such a case, as indicated by a dashed line in FIG. 2 which is a comparison example, if the manual valve 17 is controlled to be put in a D range position and the hydraulic circuit is switched to the hydraulic circuit for the D range at a time t1 i.e., at a switching timing of a target range from the N range to the D range, the switching of the hydraulic circuit to the hydraulic circuit for the D range is performed before the fluid pressure that acts on the friction engagement element fully decreases, which results in that the fluid pressure that acts on the friction engagement element cannot be fully lowered. Thus, in such a case, since the fluid pressure control for raising the fluid pressure that acts on the friction engagement element is started in a state where the fluid pressure that acts on the friction engagement element has not fully decreased, the fluid pressure that acts on the friction engagement element may rise steeply and abruptly, which may cause a shock in the automatic transmission.

For a counter-measure for the above, in the present embodiment, when a target range is switched, a full decrease of the fluid pressure is determined, i.e., it is determined whether the fluid pressure that acts on the just-engaged friction engagement element switched to an engaged-state from a released-state according to such a switching of the target range is in a fully-decreased state (e.g., a state in which the fluid pressure is below a threshold value and a starting of a control for raising the fluid pressure will do no harm in the system), by performing, in the ECU 24, a manual valve control program of FIG. 3 described later, and, when the fluid pressure of the operation fluid acting on the engagement element is not in a fully-decreased state, the switching timing of the hydraulic circuit by the manual valve 17 is delayed relative to a usual timing.

More practically, at a time t1 when a target range is switched, as shown in FIG. 2, if it determined that the fluid pressure that acts on the just-engaged friction engagement element (i.e., in FIG. 2, a friction engagement element) is not in a fully-decreased state such that remaining pressure exists, the manual valve 17 is controlled, at a time t2, i.e., at a time after a lapse of predetermined delay from the time t1, to be put in a position corresponding to the switched target range, for the switching of the hydraulic circuit corresponding to the switched target range. In such manner, even when the fluid pressure that acts on the just-engaged friction engagement element (i.e., a friction engagement element in FIG. 2) has not yet fully decreased at a target range switching time of t1, the hydraulic circuit can be switched by the manual valve 17 at the time t2, i.e., at a delayed time when the fluid pressure that acts on the just-engaged friction engagement element has already fully decreased.

Further, in the present embodiment, it is determined that the fluid pressure that acts on the just-engaged friction engagement element has not yet decreased to be in a fully-decreased state if two conditions (A) and (B) are satisfied. The two conditions (A) and (B) for such determination may be, for example:

(i) A condition (A): a target range switching pattern is a preset switching pattern (i.e., a pattern in which a just-released friction engagement element that is switched from an engaged-state to a released-state in a previous target range switching becomes a just-engaged friction engagement element that is switched from a released-state to an engaged-state in a current target range switching).

(ii) A condition (B): a target range switching interval is shorter than a preset duration (i.e., an interval between a previous target range switching timing t0 and a current target range switching timing t1).

Figure 3:
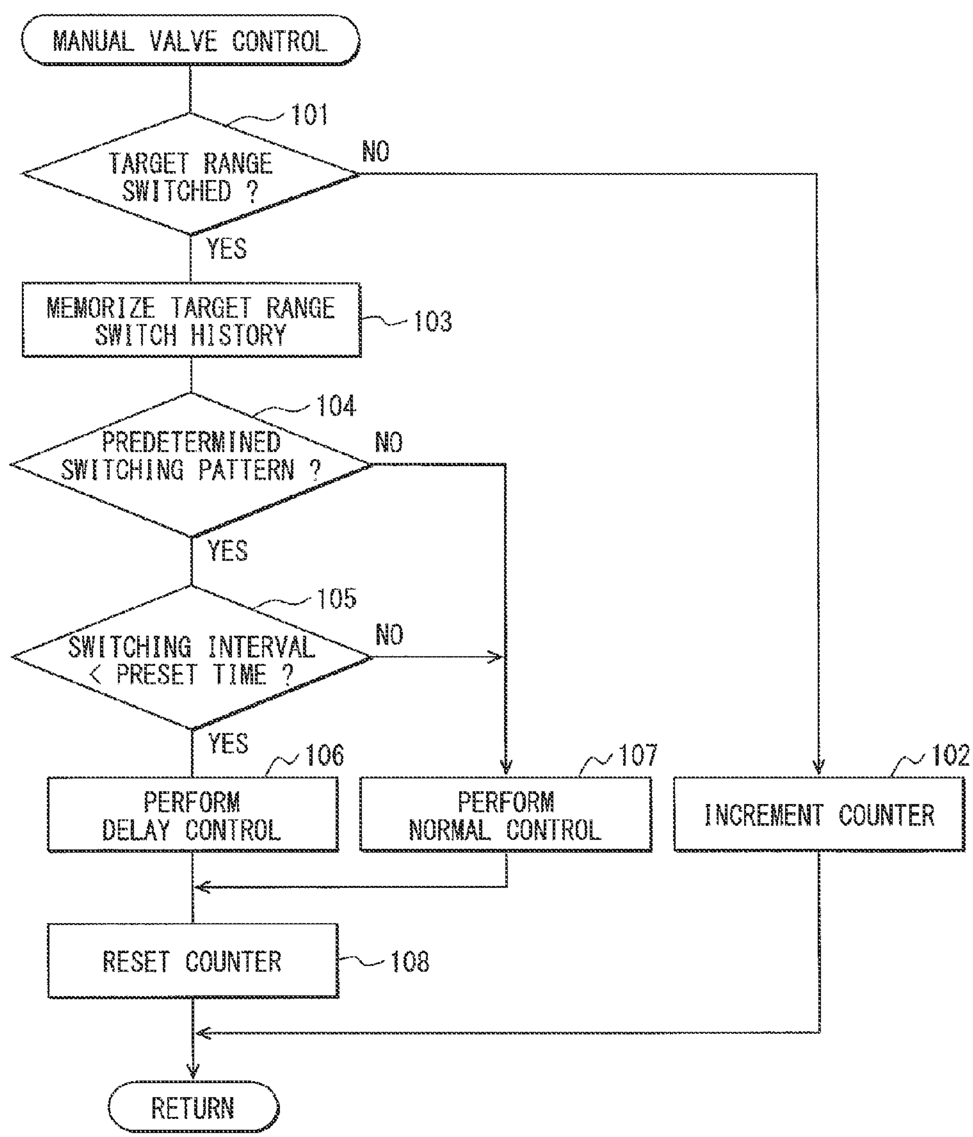
FIG. 3 is a flowchart of a process performed by a manual valve control program.

Hereafter, the contents of a process of a manual valve control program of FIG. 3 which is executed by the ECU 24 are described.

The manual valve control program shown in FIG. 3 is repeatedly executed at a predetermined interval during a power ON time of the ECU 24 (e.g., during the ON period of an ignition switch). When this program is started, whether a target range is switched is determined at Step 101.

At this Step 101, when it is determined that the target range is not switched, the process proceeds to Step 102, and a counted value of a range switching interval counter which counts a lapse time from the previous target range switching timing is incremented, and this routine is ended.

Then, when it is determined that the target range has been switched at the above-mentioned Step 101, the process proceeds to Step 103 and a switch history of the target range (e.g., a current target range, a previous target range, and a target range before previous one) is memorized.

Then, the process proceeds to Step 104 and it is determined whether the switch pattern of the target range is a predetermined switch pattern. In this case, the predetermined switch pattern is a switch pattern described above as a condition (A), that is, a pattern in which a just-released friction engagement element that is switched from an engaged-state to a released-state in a previous target range switching becomes a just-engaged friction engagement element that is switched from a released-state to an engaged-state in a current target range switching.

For example, in such a pattern, a target range is switched from the D range to the N range and back to the D range, or a target range is switched from an R range to the N range and back to the R range, among others.

At this Step 104, when it is determined that the switch pattern of the target range is a predetermined switch pattern, the process proceeds to Step 105 and it is determined whether a target range switching interval (i.e., an interval between a current target range switching timing and a previous target range switching timing) is shorter than a preset time based on the counted value of the range switching interval counter. Here, the preset time is set as a time/duration which is required for the fluid pressure that acts on this just-engaged friction engagement element (i.e., a previous release side friction engagement element) to be fully decreased. This preset time may be variably changed according to fluid temperature etc.

When it is determined that the switch pattern of the target range is a predetermined switch pattern at the above-mentioned Step 104, and, when it is determined that a target range switching interval is shorter than preset time at the above-mentioned Step 105, it is determined that the fluid pressure that acts on the just-engaged friction engagement element is not in a fully-decreased state, and the process proceeds to Step 106, and a manual valve switching delay control is executed. In this manual valve switching delay control, the switching timing of the hydraulic circuit by the manual valve 17 is delayed relative to a usual timing. More practically, as shown in FIG. 2, at a time t2 which is after a predetermined delay time from the time t1 at which a target range is switched, the manual valve 17 is controlled to be in a position corresponding to a target range, and the hydraulic circuit is switched to the one corresponding to the target range. Here, the delay time is set as a time amount somewhat shorter than a time amount between the time t1 at which the target range is switched and a time t3 at which the fluid pressure instruction value is switched.

Then, the process proceeds to Step 108, and the counted value of the range switching interval counter is reset to "0", and an execution of this routine is ended. In this case, the process at Steps 104, 105 serves as a decreased fluid-pressure determiner in the claims, and the process at Step 106 serves as a hydraulic circuit time delayer in the claims.

On the other hand, when it is determined that the switch pattern of the target range is not a predetermined switch pattern at the above-mentioned Step 104, or, when it is determined that a target range switching interval is longer than the predetermined time at the above-mentioned Step 105, the process proceeds to Step 107 and a usual manual valve switching control is performed.

In this usual manual valve switching control, the manual valve 17 is controlled, at the time t1 at which the target range is switched, to be put in the position corresponding to the switched target range, and to switch the hydraulic circuit to the one corresponding to the switched target range. Then, the process proceeds to Step 108, and the counted value of the range switching interval counter is reset to "0", and an execution of this routine is ended.

In the present embodiment described above, when a target range is switched, it is determined whether the fluid pressure that acts on the just-engaged friction engagement element that is switched to an engaged-state from a released-state, according to the switching of the target range, is in a fully-decreased state, and when it is determined that the fluid pressure that acts on the just-engaged friction engagement element is not in a fully-decreased state, the switching timing of the hydraulic circuit by the manual valve 17 is configured to be delayed more than usual. In such manner, even when (i) a target range is switched and (ii) the fluid pressure that acts on the just-engaged friction engagement element has not yet fully decreased, a delay time is provided to wait for a full decrease of the fluid pressure that acts on the just-engaged friction engagement element, and a hydraulic circuit is switched by the manual valve 17 in such a fully-decreased state of the fluid pressure. Thus, a steep and abrupt rise of the fluid pressure that acts on the just-engaged friction engagement element and a shock caused by the steep rise of the fluid pressure are both prevented.

Further, in the present embodiment, it is determined that the fluid pressure that acts on the just-engaged friction engagement element has not in a fully-decreased state if the two conditions (A) and (B) are satisfied. That is, if the condition (A): a target range switching pattern is a preset switching pattern (i.e., a pattern in which a just-released friction engagement element that is just-recently switched from an engaged-state to a released-state in a previous target range switching becomes a just-engaged friction engagement element that is just-recently switched from a released-state to an engaged-state in a current target range switching) and the condition (B): a target range switching interval is shorter than a preset duration/time amount (i.e., an interval between a previous target range switching timing t0 and a current target range switching timing t1) are both satisfied, it is determined that the fluid pressure is not yet in a fully-decreased state. According to such a determination scheme, even when a system is not equipped with a pressure sensor for detecting the fluid pressure of the operation fluid acting on the friction engagement element, it is determinable whether the fluid pressure that acts on the just-engaged friction engagement element is in a fully-decreased state.

Further, if a system is equipped with a pressure sensor for detecting a fluid pressure of the operation fluid acting on the friction engagement element, it may be determined whether the fluid pressure of the operation fluid acting on the just-engaged friction engagement element is in a fully-decreased state (e.g., whether the fluid pressure is below a predetermined value) based on the output of the pressure sensor.

Further, since the present disclosure is applied to a system which controls an operation of the manual valve 17 by controlling the motor 20 according to a target range, a manual valve switching delay control (i.e., a control by which the switching timing of the hydraulic circuit by the manual valve 17 is delayed more than usual) is easily realizable.

Although, in the above embodiment, it is configured that (i) the manual valve 17 is mechanically connected with the motor 20 and the converter 21 (e.g., a detent mechanism) and (ii) the ECU 24 controls the motor 20 according to an operation position of the range selector 22, for a control of an operation of the manual valve 17, such a configuration may be changed to a different one. That is, for example, the detent mechanism may be mechanically connected with a range selector and the manual valve may be mechanically connected with an electromagnetism actuator (e.g., a linear solenoid etc.), for the ECU to control the electromagnetism actuator according to an operation position of the range selector or the detent mechanism, and to control an operation of the manual valve.

Although the present disclosure has been fully described in connection with a preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A control device for an automatic transmission comprising:

a manual valve switching a hydraulic circuit to control a flow of an operation fluid acting on a friction engagement element disposed in a gearbox;

a fluid-pressure control valve controlling a fluid pressure of the operation fluid acting on the friction engagement element;

a controller switching a shift range to a target range according to an operation of a range selector by controlling the manual valve and the fluid-pressure control valve;

a decreased fluid-pressure determiner determining whether the fluid pressure of the operation fluid acting on a just-engaged friction engagement element, which is switched from a released-state to an engaged-state according to a switching of the target range, is fully decreased; and a hydraulic circuit time delayer delaying a switching timing of the hydraulic circuit by the manual valve to a delayed timing when it is determined that the fluid pressure of the operation fluid that acts on the just-engaged friction engagement element is not in a fully-decreased state.

2. The control device of claim 1, wherein the decreased fluid-pressure determiner determines that the fluid pressure of the operation fluid acting on the just-engaged friction engagement element is not in a fully-decreased state when (A) a switch pattern of the target range is a pattern in which a just-released friction engagement element, which is switched from the engaged-state to the released-state in a previous target range switching, becomes the just-engaged friction engagement element in a current target range switching, and (B) a target range switching interval is shorter than a preset interval between a previous target range switching timing and a current target range switching timing.

3. The control device of claim 1, further comprising:

a motor driving the manual valve, wherein the controller controls the manual valve by controlling the motor according to the target range.

* * * * *